United States Patent
Van Haendel et al.

(10) Patent No.: US 12,496,780 B2
(45) Date of Patent: Dec. 16, 2025

(54) METHOD AND APPARATUS FOR PRODUCING AN OBJECT BY MEANS OF ADDITIVE MANUFACTURING

(71) Applicant: Additive Industries B.V., Eindhoven (NL)

(72) Inventors: Rob Peter Albert Van Haendel, Eindhoven (NL); Erwin Wijn, Eindhoven (NL)

(73) Assignee: Additive Industries B.V., Eindhoven (NL)

( * ) Notice: Subject to any disclaimer, the term of this patent is extended or adjusted under 35 U.S.C. 154(b) by 740 days.

(21) Appl. No.: 17/598,643

(22) PCT Filed: Jan. 14, 2020

(86) PCT No.: PCT/NL2020/050018
§ 371 (c)(1),
(2) Date: Sep. 27, 2021

(87) PCT Pub. No.: WO2020/204696
PCT Pub. Date: Oct. 8, 2020

(65) Prior Publication Data
US 2022/0161328 A1 May 26, 2022

(30) Foreign Application Priority Data
Mar. 29, 2019 (NL) ...................... 2022840

(51) Int. Cl.
*B29C 64/393* (2017.01)
*B22F 10/28* (2021.01)
(Continued)

(52) U.S. Cl.
CPC ............ *B29C 64/393* (2017.08); *B22F 10/28* (2021.01); *B22F 10/31* (2021.01); *B22F 10/36* (2021.01);
(Continued)

(58) Field of Classification Search
CPC ..... B29C 64/393; B29C 64/153; B22F 10/28; B22F 10/36; B22F 10/85; B33Y 10/00; B33Y 30/00; B33Y 50/02
See application file for complete search history.

(56) References Cited

U.S. PATENT DOCUMENTS

| 8,605,256 B2 * | 12/2013 | DeVoe | B33Y 10/00 355/68 |
| 2016/0184893 A1 * | 6/2016 | Dave | B33Y 50/02 419/53 |
| 2018/0348492 A1 * | 12/2018 | Pavlov | B29C 64/393 |

FOREIGN PATENT DOCUMENTS

| CN | 101960385 A | 1/2011 |
| DE | 102015011013 A1 | 2/2016 |

(Continued)

OTHER PUBLICATIONS

International Search Report and Written Opinion mailed Mar. 18, 2020 for PCT/NL2020/050018.

(Continued)

*Primary Examiner* — Sally A Merkling
*Assistant Examiner* — Nazmun Nahar Shams
(74) *Attorney, Agent, or Firm* — Suiter Swantz IP

(57) ABSTRACT

Method for producing an object by additive manufacturing including the steps of determining, via a first determining unit, a characteristic of a beam of electromagnetic radiation at a first position of the beam and determining, via a second determining unit, the characteristic of the beam of electromagnetic radiation at a second position, and calibrating, via a control unit, the second determining unit according to the characteristic of the beam, determined by the first determining unit. An apparatus for manufacturing an object by additive manufacturing.

18 Claims, 3 Drawing Sheets

(51) Int. Cl.
*B22F 10/31* (2021.01)
*B22F 10/36* (2021.01)
*B22F 10/85* (2021.01)
*B29C 64/153* (2017.01)
*B33Y 10/00* (2015.01)
*B33Y 30/00* (2015.01)
*B33Y 50/02* (2015.01)

(52) U.S. Cl.
CPC ............ *B22F 10/85* (2021.01); *B29C 64/153* (2017.08); *B33Y 10/00* (2014.12); *B33Y 30/00* (2014.12); *B33Y 50/02* (2014.12)

(56) References Cited

FOREIGN PATENT DOCUMENTS

| | | |
|---|---|---|
| DE | 102018112247 A1 | 12/2018 |
| EP | 2257854 B1 | 10/2018 |
| EP | 3616887 A1 | 3/2020 |
| NL | 2013861 B1 | 10/2016 |
| WO | 2009108543 A2 | 9/2009 |

OTHER PUBLICATIONS

Chinese Patent Office, Office Action received in CN Application No. 202080026040.7, Jul. 19, 2024, 12 pages (including translation).
European Patent Office, Office Action received in EP Application No. 20701381.4, Jul. 6, 2023, 8 pages.

\* cited by examiner

METHOD AND APPARATUS FOR PRODUCING AN OBJECT BY MEANS OF ADDITIVE MANUFACTURING

TECHNICAL FIELD AND BACKGROUND

The present disclosure relates according to a first aspect to a method for producing an object by means of additive manufacturing using an apparatus.

According to a second aspect the present disclosure relates to an apparatus for manufacturing an object by means of additive manufacturing.

3D printing or additive manufacturing refers to any of various processes for manufacturing a three-dimensional object in which material is joined or solidified under computer control to create a three-dimensional object, with material being added together, typically layer by layer. Traditional techniques like injection molding can be less expensive for manufacturing, for example, polymer products in high quantities, but 3D printing or additive manufacturing can be faster, more flexible and less expensive when producing relatively small quantities of three-dimensional objects.

The three-dimensional object may be produced by selectively solidifying, in a layer-like fashion, a powder material to produce a three-dimensional, 3D, object. In particular, a computer controlled additive manufacturing apparatus may be used which sequentially sinters a plurality of layers to build the desired object in a layer-by-layer fashion. Primarily additive processes are used, in which successive layers of material are laid down under computer control. These objects can be of almost any shape or geometry, and are produced from a 3D model or other electronic data source.

In order to print a three-dimensional object, a printable model is to be created with a computer design package or via a 3D scanner, for example. Usually, the input is a 3D CAD file such as an STL file, a STEP file or a IGS file. Before printing the object from a CAD file, the file is to be processed by software, which converts the model into a series of thin subsequent layers. Further, apparatus settings and vectors are generated for controlling the creation of each of the subsequent layers.

A solidifying device, preferably a laser, comprised by the computer controlled additive manufacturing apparatus follows these settings and vectors to solidify successive layers of material to build the 3D object from a series of cross sections. These layers, which correspond to the virtual cross sections from the CAD model, are during this process joined or fused at the same time to create the final 3D object.

Known systems to print a three-dimensional object comprise:
- a process chamber for receiving a bath of powdered material which can be solidified by exposure to electromagnetic radiation;
- a support for positioning said object in relation to a surface level of said bath of powdered material;
- a solidifying device arranged for emitting a beam of electromagnetic radiation on said surface level for solidifying a selective part of said powdered material; and
- a control unit for controlling said apparatus.

One of the challenges of the known systems, in particular for known systems for producing a metal object by additive manufacturing, is how to further improve the quality of the manufactured object while realising a relative large manufacturing output.

BRIEF SUMMARY

It is an object of the present disclosure to provide an apparatus and a method for producing an object, by additive manufacturing, that allows to improve the quality of the manufactured object while realising a relative large manufacturing output.

This objective is achieved by the method according to the present disclosure using an apparatus that comprises:
- a first determining unit for determining a characteristic of said beam of electromagnetic radiation at a first position of said beam of electromagnetic radiation;
- a second determining unit for determining said characteristic of said beam of electromagnetic radiation at a second position, wherein said second position is related to a position that is displaced towards said solidifying device, in use along said beam of electromagnetic radiation, relative to said first position or wherein said second position is along a further beam of electromagnetic radiation, wherein said further beam of electromagnetic radiation is split off from said beam of electromagnetic radiation.

By providing a first determining unit, a characteristic of said beam of electromagnetic radiation may be determined at a first position. For this purpose the first determining unit is arranged and positioned for determining a characteristic of said beam of electromagnetic radiation at said first position of said beam of electromagnetic radiation. In other words, the first determining unit is arranged and positioned such that a characteristic of said beam of electromagnetic radiation at said first position of said beam of electromagnetic radiation is determinable. The first position may for instance be positioned at a location that is related to the surface level of said bath of powdered material. The first position may for instance be provided at a height in the process chamber that is identical to a height of said surface level of said bath of powdered material. Such a first position is beneficial for obtaining information about said beam of electromagnetic radiation, wherein said characteristic at said first position may be equal, or at least very similar, to a characteristic of said beam of electromagnetic radiation at the location of solidifying said powdered material during the actual process of solidifying said powdered material while producing said object.

The present disclosure relies at least partly on the insight that determining a characteristic of the beam of electromagnetic radiation during the process of manufacturing said object at a processing location where the powdered material is solidified may be favorable for realizing a relative high product quality. Taking into account the determined characteristic, by the first determination unit, the solidifying device may for instance be actively controlled to correct for detected variations of the characteristic of said beam of electromagnetic radiation during the manufacturing process. This first position may, however, not be favorable for realizing a relative large manufacturing output. The first position may for instance require the beam of electromagnetic radiation to be moved away from the processing location and thereby interrupt interaction of said beam of electromagnetic radiation with said powdered material thereby increasing processing time and potentially negatively affecting product quality.

By providing the second determining unit said characteristic of said beam of electromagnetic radiation may be determined at a second position of said beam of electromagnetic radiation. For this purpose the second determining unit is arranged and positioned for determining a characteristic of said beam of electromagnetic radiation at said second position of said beam of electromagnetic radiation. In other words, the second determining unit is arranged and positioned such that a characteristic of said beam of electromagnetic radiation at said second position of said beam of electromagnetic radiation is determinable. The second position may be either related to a position that is displaced towards said solidifying device, in use along said beam of electromagnetic radiation, relative to said first position or to a position along a further beam of electromagnetic radiation, wherein said further beam of electromagnetic radiation is split off from said beam of electromagnetic radiation. In this way said characteristic may be determined during the manufacturing process of said material without the need for interrupting the manufacturing process. The second determining unit is beneficial for allowing a relative large manufacturing output while determining a characteristic of said beam of electromagnetic radiation.

A drawback of determining the characteristic of said beam of electromagnetic radiation at said second position is that for instance a value of said characteristic determined by said second determining unit may differ from for instance a value of said characteristic at said first location and said processing location. This drawback is overcome by the method according to the first aspect of the present disclosure in that the method comprises the steps of:
   determining, by said first determining unit, said characteristic of said beam of electromagnetic radiation at said first position of said beam of electromagnetic radiation and, preferably simultaneously, determining, by said second determining unit, said characteristic at said second position;
   calibrating, by said control unit, said second determining unit taking into account said characteristic of said beam of electromagnetic radiation, determined by said first determining unit.

By determining said characteristic of said beam of electromagnetic radiation at said first position and said second position and calibrating the second determining unit taking into account said characteristic of said beam of electromagnetic radiation, determined by said first determining unit a relative high quality of the manufactured object may be obtained while realizing a relative large manufacturing output. By calibrating the second determining unit using measurement results of the first determining unit a value of said characteristic may be obtained, by said second determining unit, that correlates relative well with said value of said characteristic at said first location.

Preferably, the control unit is communicatively coupled to the first determining unit and the second determining unit for said calibrating.

Preferably, said characteristic of said beam of electromagnetic radiation is simultaneously determined by said first determining unit and said second determining unit. This is beneficial for realizing a relative high correlation factor between for instance a value of said characteristic determined by said first determining unit and a value of said characteristic determined by said second determining unit.

In an embodiment said characteristic is at least one of a power, caustic and a focus position of said beam of electromagnetic radiation.

It is advantageous if said method further comprises the step of:
   displacing, by a displacement unit, said beam of electromagnetic radiation relative to said first determining unit before executing said step of determining.

Displacing said beam of electromagnetic radiation is beneficial for allowing said characteristic to be determined at a location inside said apparatus that is relatively practical. The first location may for instance be chosen such that the first determining unit is not affected, or only to a limited extent, by the environmental conditions present in the processing chamber. The first determining unit may for instance be maintained in a location wherein temperature is controlled to a favourable level as regards the first determining unit.

In a very practical embodiment of the method according to the first aspect of the present disclosure, said second determining unit is arranged for detecting said characteristic of said beam of electromagnetic radiation at said second position during said manufacturing of said object, wherein said method further comprises the step of:
   controlling, by said control unit, said solidifying device taking into account said detected characteristic of said beam of electromagnetic radiation at said second position during said manufacturing of said object;
wherein said step of controlling is executed after said step of calibrating.

Controlling said solidifying device during manufacturing taking into account said detected characteristic is beneficial to compensate for variations of said characteristic that may occur during the manufacturing of the object and thereby realize a relative high product quality.

Preferably, during said step of controlling, said solidifying device is controlled such that said characteristic of said beam of electromagnetic radiation is maintained substantially constant. This is beneficial for realising a relative constant solidification process during manufacturing of the object and thereby realize a relative high product quality.

It is beneficial if said apparatus comprises a measurement chamber housing said first determining unit. The measurement chamber is beneficial for realising that the first determining unit may be subjected to favourable environmental conditions. The measurement chamber may for instance be maintained in a predetermined temperature range that is favourable as regards the first determining unit.

Preferably, said measurement chamber is separated from said process chamber. A measurement chamber that is separate from the process chamber is beneficial for realizing that the first determining unit is not affected, or only to a limited extent, by the environmental conditions present in the processing chamber.

In this regard, it is beneficial if, during said step of displacing, said beam of electromagnetic radiation is displaced by displacing said solidifying device, by said displacement unit, relative to said first determining unit. This is beneficial for allowing said measurement chamber to be provided at a relative large distance from said process chamber thereby realising that the first determining unit may be subjected to favourable environmental conditions.

It is advantageous if said first position is such that a value of said characteristic of said beam of electromagnetic radiation, determined by said first determining unit, is an absolute measure for said characteristic of said beam of electromagnetic radiation at said surface level. This is beneficial for allowing characteristics of beams of electromagnetic radiation from different solidifying devices of a single apparatus or beams of electromagnetic radiation from different solidifying devices of different apparatuses to be compared.

Preferably, said apparatus comprises a plurality of said solidifying devices and a corresponding plurality of said second determining units, wherein each of said second determining units is associated with a solidifying device of said plurality of said solidifying devices for determining said characteristic of said beam of electromagnetic radiation emitted, in use, from said corresponding solidifying device; wherein said method comprises the steps of:

determining for each of said solidifying devices, by said first determining unit, said characteristic of said beam of electromagnetic radiation at said first position of said beam of electromagnetic radiation and, preferably simultaneously, determining, by said corresponding second determining unit, said characteristic of said beam of electromagnetic radiation at said second position;

calibrating, by said control unit, each of said corresponding second determining units taking into account said characteristic of said beam of electromagnetic radiation, determined by said first determining unit.

Alternatively, the second determining unit is arranged for determining a further characteristic that is related to said characteristic of said beam of electromagnetic radiation at a second position, wherein said second position is related to a position that is displaced towards said solidifying device, in use along said beam of electromagnetic radiation, relative to said first position or wherein said second position is along a further beam of electromagnetic radiation, wherein said further beam of electromagnetic radiation is split off from said beam of electromagnetic radiation.

Preferably, said further characteristic is is at least one of a power, a caustic, and a focus position of said beam of electromagnetic radiation.

Preferably, said solidifying device comprises said second determining unit.

In a further embodiment of the method according to the first aspect of the present disclosure for producing an object by means of additive manufacturing using an apparatus, said apparatus comprises:

said process chamber for receiving said bath of powdered material which can be solidified by exposure to electromagnetic radiation;

said support for positioning said object in relation to said surface level of said bath of powdered material;

said solidifying device arranged for emitting said beam of electromagnetic radiation on said surface level for solidifying said selective part of said powdered material, wherein said solidifying device comprises said second determining unit for determining said characteristic of said beam of electromagnetic radiation at said second position;

said first determining unit for determining said characteristic of said beam of electromagnetic radiation at said first position of said beam of electromagnetic radiation; and said control unit for controlling said apparatus;

wherein said method comprises the steps of:

determining, by said first determining unit, said characteristic of said beam of electromagnetic radiation at said first position of said beam of electromagnetic radiation and, preferably simultaneously, determining, by said second determining unit, said characteristic at said second position;

calibrating, by said control unit, said second determining unit taking into account said characteristic of said beam of electromagnetic radiation, determined by said first determining unit.

According to the second aspect, the present disclosure relates to an apparatus for manufacturing an object by means of additive manufacturing, said apparatus comprising:

a process chamber for receiving a bath of powdered material which can be solidified by exposure to electromagnetic radiation;

a support for positioning said object in relation to a surface level of said bath of powdered material;

a solidifying device arranged for emitting a beam of electromagnetic radiation on said surface level for solidifying a selective part of said powdered material;

a first determining unit for determining, in use, a characteristic of said beam of electromagnetic radiation at a first position of said beam of electromagnetic radiation;

a second determining unit for determining, in use, said characteristic of said beam of electromagnetic radiation at a second position, wherein said second position is displaced towards said solidifying device, in use along said beam of electromagnetic radiation, relative to said first position or wherein said second position is along a further beam of electromagnetic radiation, wherein said further beam of electromagnetic radiation is split off from said beam of electromagnetic radiation; and a control unit arranged for calibrating said second determining unit taking into account said characteristic of said beam of electromagnetic radiation, determined, in use, by said first determining unit.

Embodiments of the apparatus according to the second aspect correspond to embodiments of the method according to the first aspect of the present disclosure. The advantages of the apparatus according to the second aspect correspond to advantages of the method according to first aspect of the present disclosure presented previously.

Preferably, said first determining unit and/or said second determining unit is/are arranged for determining at least one:

a power, a caustic and a focus position of said beam of electromagnetic radiation.

Preferably, the first determining unit is arranged and positioned for determining a characteristic of said beam of electromagnetic radiation at said first position of said beam of electromagnetic radiation. In other words, the first determining unit is arranged and positioned such that a characteristic of said beam of electromagnetic radiation at said first position of said beam of electromagnetic radiation is determinable.

Preferably, the second determining unit is arranged and positioned for determining a characteristic of said beam of electromagnetic radiation at said second position of said beam of electromagnetic radiation. In other words, the second determining unit is arranged and positioned such that a characteristic of said beam of electromagnetic radiation at said second position of said beam of electromagnetic radiation is determinable.

It is beneficial if said apparatus comprises a displacement unit arranged for displacing said beam of electromagnetic radiation relative to said first determining unit. Providing a displacement unit is beneficial for displacing said beam of electromagnetic radiation relative to said first determining unit and thereby allowing to determine said characteristic at a location inside said apparatus that is relatively practical. The first location may for instance be chosen such that the first determining unit is not affected, or only to a limited extent, by the environmental conditions present in the processing chamber. The first determining unit may for instance be maintained in a location wherein temperature is controlled to a favourable level as regards the first determining unit.

Preferably, said apparatus comprises a measurement chamber housing said first determining unit. The is beneficial for realising that the first determining unit may be subjected to favourable environmental conditions. The measurement chamber may for instance be maintained in a predetermined temperature range that is favourable as regards the first determining unit.

In this regard, it is advantageous if said measurement chamber is separated from said process chamber. A measurement chamber that is separate from the process chamber is beneficial for realizing that the first determining unit is not affected, or only to a limited extent, by the environmental conditions present in the processing chamber.

In this regard, it is beneficial if, said displacement unit is arranged for displacing said solidifying device relative to said first determining unit. This is beneficial for allowing said measurement chamber to be provided at a relative large distance from said process chamber thereby realising that the first determining unit may be subjected to favourable environmental conditions.

Preferably, said first position is such that a value of said characteristic of said beam of electromagnetic radiation, in use of said apparatus determined by said first determining unit, is an absolute measure for said characteristic of said beam of electromagnetic radiation at said surface level.

In an embodiment of the apparatus according to the second aspect, said second position is such that said characteristic of said beam of electromagnetic radiation is determinable at said second position during said manufacturing of said object. Determining said characteristic at said second position during manufacturing is beneficial for allowing controlling of said solidifying device during manufacturing of said object taking into account said detected characteristic to compensate for variations of said characteristic that may occur during the manufacturing of the object and thereby realize a relative high product quality.

Preferably, said solidifying device comprises said second determining unit.

The apparatus and method according to the present disclosure will next be explained by means of the accompanying figures. In the figures:

DETAILED DESCRIPTION

Figure 1:
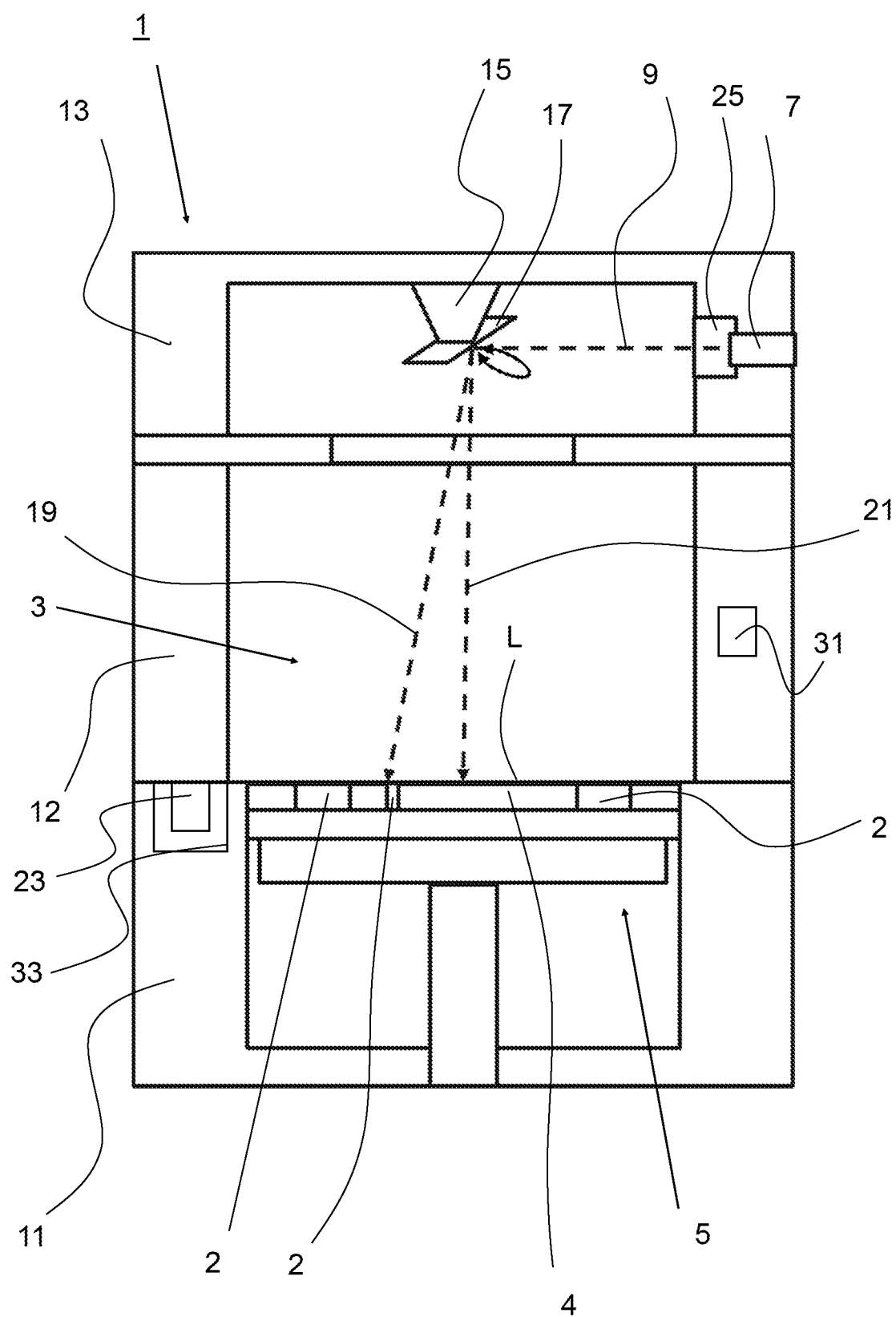
FIG. 1: shows a schematic overview of an apparatus according to the second aspect of the present disclosure.
Figure 2:
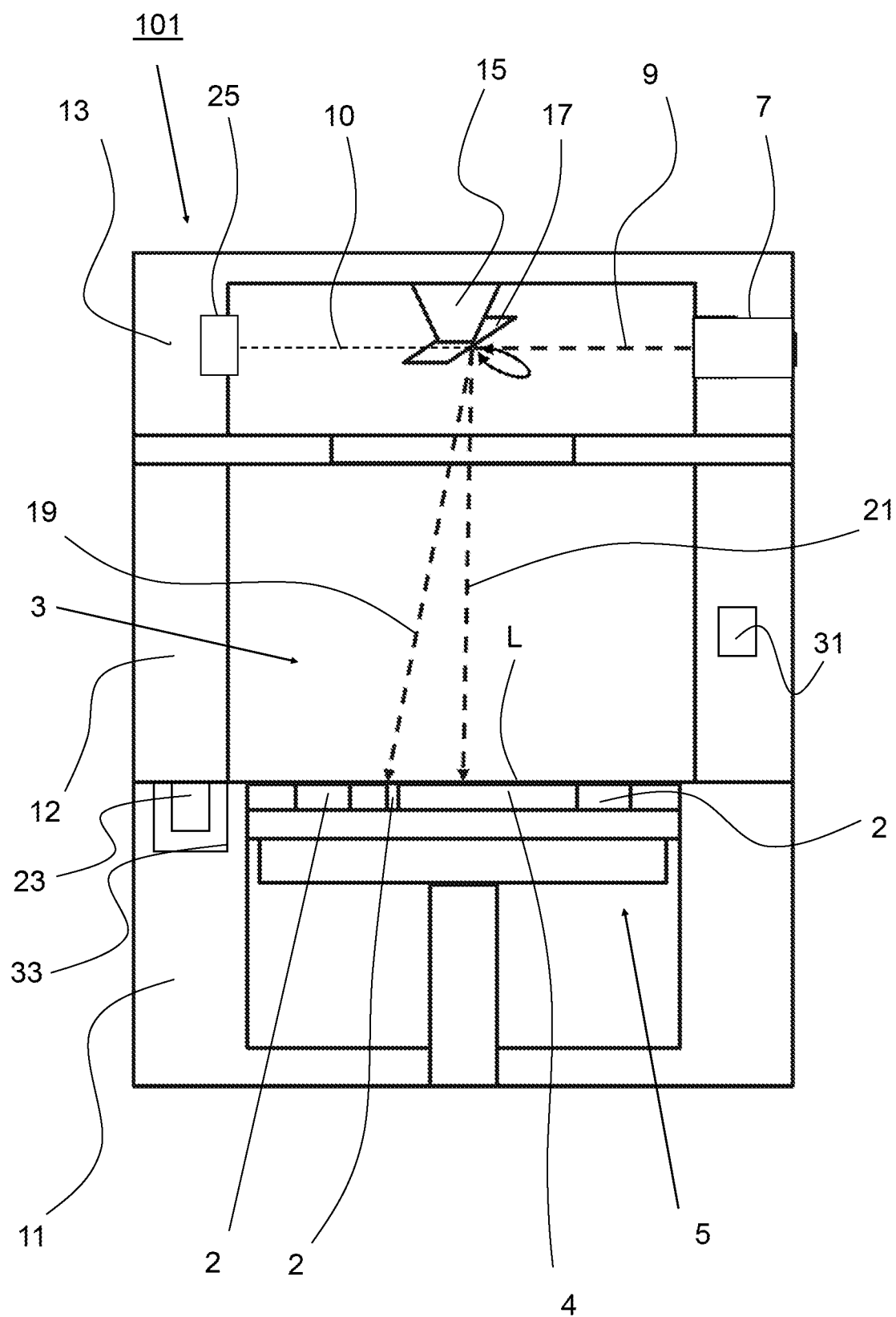
FIG. 2: shows a schematic overview of another system according to the second aspect of the present disclosure.
Figure 3:
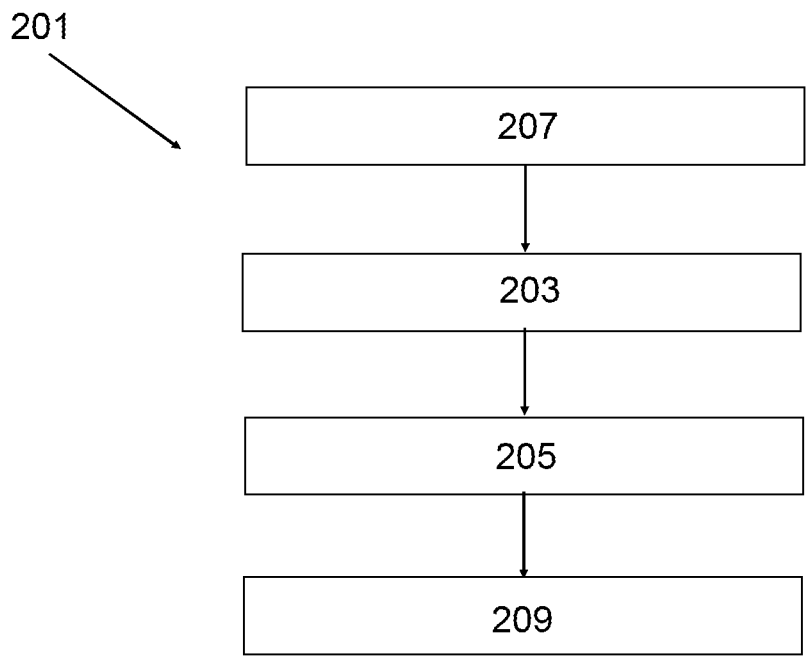
FIG. 3: shows a schematic overview of a method according to the first aspect of the present disclosure.
Figure 4:
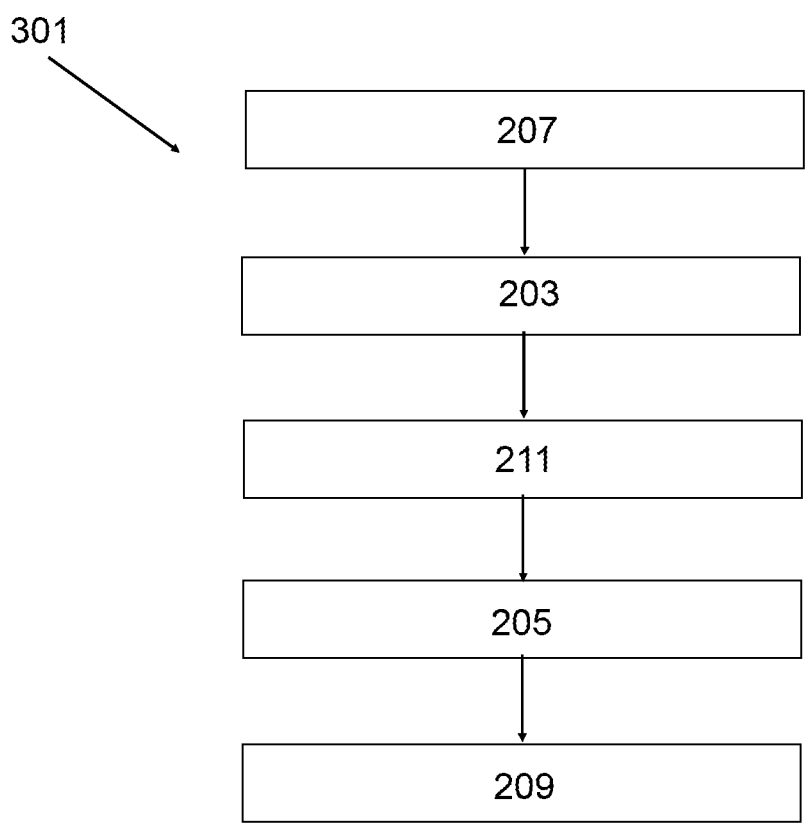
FIG. 4: shows a schematic overview of a another method according to the first aspect of the present disclosure.

FIG. 1 shows an overview of an apparatus 1 for producing an object 2 by means of additive manufacturing. The apparatus 1 is built from several frame parts 11, 12, 13. The apparatus comprises a process chamber 3 for receiving a bath of material 4 which can be solidified. In a lower frame part 11, a shaft is formed, wherein a support 5 is provided for positioning the object 2 (or even objects) in relation to the surface level L of the bath of material 4. The support 5 is movably provided in the shaft, such that after solidifying a layer, the support 5 may be lowered, and a further layer of material may be solidified on top of the part of the object 2 already formed. In a top part 13 of the apparatus 1, a solidifying device 7 is provided for solidifying a selective part of the material 4. In the embodiment shown, the solidifying device 7 is a laser device, which is arranged for producing electromagnetic radiation in the form of laser light, in order to melt powdered material 4 provided on the support 5, which then, after cooling forms a solidified part of the object 2 to be produced. However, the invention is not limited to the type of solidifying device. As can be seen, the electromagnetic radiation 9 emitted by the laser device 7 is deflected by means of a displacement unit comprising a deflector unit 15, which uses a rotatable optical element 17 to direct the emitted radiation 9 towards the surface L of the layer of material 4. Depending on the position of the deflector unit 15, radiation may be emitted, as an example, according to rays 19, 21.

Apparatus 1 further comprises a first determining unit 23, a second determining unit 25 and a control unit 31. The first determining unit 23 may for instance comprise a detector for detecting a power, a caustic and/or a focus position of said beam of electromagnetic radiation 9 at a first position. The first position corresponds to a height of said surface level L. The first determining unit 23 is provided in a measurement chamber 33. The measurement chamber 33 is provided next to the process chamber 3 and, preferably, at least partly thermally decoupled from the process chamber 3. Alternatively, or in addition to the thermal decoupling, the measurement chamber 33 may be coupled to a conditioning arrangement (not shown) for conditioning a receiving space of said measurement chamber 33 and thereby maintaining said first determining unit 23 in a conditioned environment. Maintaining said first determining unit 23 in a conditioned environment is beneficial for reducing a measurement inaccuracy due to the first determining unit 23 when determining said characteristic of said beam of electromagnetic radiation 9.

The second determining unit 25 is provided at a second position. The second position is displaced towards said solidifying device 7, in use along said beam of electromagnetic radiation 9, relative to said first position. The second determining unit 25 may for instance comprise a detector for detecting a power, a caustic and/or a focus position of said beam of electromagnetic radiation 9. Alternatively, said solidifying device 7 may comprise said second determining unit 25.

The control unit 31 is communicatively coupled to said first determining unit 23, said second determining unit 25 and said solidifying device 7. Communicatively coupling both the first determining unit 23 and the second determining unit 25 to the control unit 31 is beneficial for calibrating, by said control unit 31, said second determining unit 25 taking into account said characteristic of said beam of electromagnetic radiation 9, determined by said first determining unit 23.

Apparatus 101 differs mainly from apparatus 1 in that said second position is along a further beam of electromagnetic radiation 10, wherein said further beam of electromagnetic radiation 10 is split off from said beam of electromagnetic radiation 9. Locating said second position along said further beam of electromagnetic radiation 10 allows for detecting said characteristic of said beam of electromagnetic radiation at said second position during said manufacturing of said object 2 while reducing, or at least minimizing any disturbance due to the second determining unit 25 on said beam of electromagnetic radiation 9. Elements of apparatus 101 that are similar to elements of apparatus 1 are provided with a reference number equal to the reference number of the element in apparatus 1.

Method 201 comprises the step of displacing 207, by a displacement unit 15, said beam of electromagnetic radiation 9 relative to said first determining unit 23. During this step of displacing 207, the beam of electromagnetic radiation 9 is deflected by said deflector unit 15 towards said first determining unit 23 such that said beam of electromagnetic radiation 9 impinges upon said first determining unit 23 for determining said characteristic of said beam of electromagnetic radiation 9.

Method 201 further comprises the step of determining 203, by said first determining unit 23, said characteristic of said beam of electromagnetic radiation 9 at said first position of said beam of electromagnetic radiation 9. During the step of determining 203 the second determining unit 25 also determines said characteristic at said second position.

After said characteristic of said beam of electromagnetic radiation 9 is determined at said first position and at said second position a step of calibrating 205 is performed, by said control unit 31. During said step of calibrating 205, said second determining unit 25 is calibrated taking into account said characteristic of said beam of electromagnetic radiation 9, determined by said first determining unit 23. In other words an output of said second determining unit 25 is translated to an output of said first determining unit 23.

The calibrated second determining unit 25 may be used during manufacturing of said object 2 during a step of controlling 209. During the step of controlling 209, by said control unit 31, said solidifying device 7 is controlled taking into account said detected characteristic of said beam of electromagnetic radiation 9 at said second position. Preferably, during said step of controlling 209, said solidifying device 7 is controlled such that said characteristic of said beam of electromagnetic radiation 9 is maintained substantially constant.

Method 301 differs mainly from method 201 in that said characteristic of the beam of electromagnetic radiation 9 is determined, by said second determining unit 25, during a step of further determining 211. The characteristic at the first position and at the second position are determined during two different steps 203 and 211. Steps of method 301 that are similar to steps of method 201 are provided with a reference number equal to the reference number of the step in method 201.

The invention claimed is:

1. A method for producing an object by additive manufacturing using an apparatus, the apparatus comprising:
    a process chamber configured to receive a bath of powdered material configured to be solidified via exposure to electromagnetic radiation;
    a support configured to position the object in relation to a surface level of the bath of powdered material;
    a solidifying device configured to emit a beam of electromagnetic radiation on the surface level to solidify a selective part of the powdered material;
    a first determining unit configured and positioned to determine a characteristic of the beam of electromagnetic radiation at a first position of the beam of electromagnetic radiation, wherein the first position corresponds to a height of the surface level of the bath of powdered material;
    a second determining unit configured and positioned to determine the characteristic of the beam of electromagnetic radiation at a second position, wherein the second position is displaced towards the solidifying device, in use along the beam of electromagnetic radiation, relative to the first position or wherein the second position is along a further beam of electromagnetic radiation and distal from the surface level of the bath of powdered material, wherein the further beam of electromagnetic radiation is split off from the beam of electromagnetic radiation; and
    a controller configured to control the apparatus;
    wherein the method comprises the steps of:
        determining, via the first determining unit, the characteristic of the beam of electromagnetic radiation at the first position of the beam of electromagnetic radiation, and determining, via the second determining unit, the characteristic at the second position; and
        calibrating, via the controller, the second determining unit according to the characteristic of the beam of electromagnetic radiation, determined by the first determining unit.

2. The method according to claim 1, wherein during the step of determining, the characteristic at the first position and the second position are determined simultaneously.

3. The method according to claim 1, wherein the characteristic includes at least one of a power of the beam of electromagnetic radiation, a caustic of the beam of electromagnetic radiation, and a focus position of the beam of electromagnetic radiation.

4. The method according to claim 1, further comprising the step of:
    displacing, via a displacement unit, the beam of electromagnetic radiation relative to the first determining unit before performing the step of determining.

5. The method according to claim 1, wherein the second determining unit is configured to detect the characteristic of the beam of electromagnetic radiation at the second position during manufacturing of the object; and
    wherein the method further comprises the step of:
    controlling, via the controller, the solidifying device according to the detected characteristic of the beam of electromagnetic radiation at the second position during manufacturing of the object; and
    wherein the step of controlling is performed after the step of calibrating.

6. The method according to claim 5, wherein during the step of controlling, the solidifying device is controlled such that the characteristic of the beam of electromagnetic radiation is maintained substantially constant.

7. The method according to claim 1, wherein the apparatus further comprises a conditioned measurement chamber housing the first determining unit.

8. The method according to claim 7, wherein the conditioned measurement chamber is separated and thermally decoupled from the process chamber.

9. The method according to claim 1, wherein the first position is such that a value of the characteristic of the beam of electromagnetic radiation, determined by the first determining unit, is an absolute measure for the characteristic of the beam of electromagnetic radiation at the surface level.

10. The method according to claim 1, wherein the apparatus comprises a plurality of the solidifying devices and a corresponding plurality of the second determining units, wherein each of the second determining units is associated with a solidifying device of the plurality of the solidifying devices for determining the characteristic of the beam of electromagnetic radiation emitted, in use, from the corresponding solidifying device;
    wherein the method comprises the steps of:
        determining for each of the solidifying devices, via the first determining unit, the characteristic of the beam of electromagnetic radiation at the first position of the beam of electromagnetic radiation, and determining, via the corresponding second determining unit, the characteristic of the beam of electromagnetic radiation at the second position of the beam of electromagnetic radiation; and calibrating, via the controller, each of the corresponding second determining units according to the characteristic of the beam of electromagnetic radiation, determined by the first determining unit.

11. An apparatus for manufacturing an object by additive manufacturing, comprising:
a process chamber configured to receive a bath of powdered material configured to be solidified by exposure to electromagnetic radiation;
a support configured to position the object in relation to a surface level of the bath of powdered material;
a solidifying device configured to emit a beam of electromagnetic radiation on the surface level to solidify a selective part of the powdered material;
a first determining unit configured and positioned to determine, in use, a characteristic of the beam of electromagnetic radiation at a first position of the beam of electromagnetic radiation, wherein the first position corresponds to a height of the surface level of the bath of powdered material;
a second determining unit configured and positioned to determine, in use, the characteristic of the beam of electromagnetic radiation at a second position, wherein the second position is displaced towards the solidifying device, in use along the beam of electromagnetic radiation, relative to the first position or wherein the second position is along a further beam of electromagnetic radiation and distal from the surface level of the bath of powdered material, wherein the further beam of electromagnetic radiation is split off from the beam of electromagnetic radiation; and a controller configured to calibrate the second determining unit according to the characteristic of the beam of electromagnetic radiation, determined, in use, by the first determining unit.

12. The apparatus according to claim 11, wherein at least one of the first determining unit and the second determining unit is configured to determine at least one:
a power of the beam of electromagnetic radiation, a caustic of the beam of electromagnetic radiation, and a focus position of the beam of electromagnetic radiation.

13. The apparatus according to claim 11, wherein the apparatus further comprises a displacement unit configured to displace the beam of electromagnetic radiation relative to the first determining unit.

14. The apparatus according to claim 11, wherein the apparatus further comprises a conditioned measurement chamber housing the first determining unit.

15. The apparatus according to claim 14, wherein the conditioned measurement chamber is separated and thermally decoupled from the process chamber.

16. The apparatus according to claim 11, wherein the first position is such that a value of the characteristic of the beam of electromagnetic radiation, in use of the apparatus determined by the first determining unit, is an absolute measure for the characteristic of the beam of electromagnetic radiation at the surface level.

17. The apparatus according to claim 11, wherein the second position is such that the characteristic of the beam of electromagnetic radiation is determinable at the second position during the manufacturing of the object.

18. The apparatus according to claim 11, wherein the solidifying device comprises the second determining unit.

* * * * *